US012560316B2

(12) United States Patent
Zhang et al.

(10) Patent No.: US 12,560,316 B2
(45) Date of Patent: Feb. 24, 2026

(54) CONTROLLER AND LUMINAIRE HAVING CONTROLLER

(71) Applicant: SAVANT TECHNOLOGIES LLC, East Cleveland, OH (US)

(72) Inventors: Wubin Zhang, Shanghai (CN); Huisheng Zhou, Shanghai (CN); Yin Suo, Shanghai (CN); Pan Yao, Shanghai (CN); Sean Crawford Veit, Davidson, NC (US)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 10 days.

(21) Appl. No.: 18/526,868

(22) Filed: Dec. 1, 2023

(65) Prior Publication Data

US 2024/0183520 A1 Jun. 6, 2024

Related U.S. Application Data

(63) Continuation of application No. 17/365,470, filed on Jul. 1, 2021, now Pat. No. 11,867,381.

(30) Foreign Application Priority Data

Jul. 1, 2020 (CN) ......................... 202021252600.4

(51) Int. Cl.
*F21V 23/04* (2006.01)
*F21S 8/02* (2006.01)
(Continued)

(52) U.S. Cl.
CPC .............. *F21V 23/04* (2013.01); *F21S 8/026* (2013.01); *F21V 3/00* (2013.01); *F21V 23/004* (2013.01);
(Continued)

(58) Field of Classification Search
CPC .......... F21V 23/04; F21V 3/00; F21V 23/004; F21S 8/026; H05B 45/10; H05B 45/20; F21Y 2113/13
See application file for complete search history.

(56) References Cited

U.S. PATENT DOCUMENTS

| | | | |
|---|---|---|---|
| 5,798,691 | A | 8/1998 | Tim Kao |
| 8,143,807 | B2 | 3/2012 | Hsieh et al. |

(Continued)

FOREIGN PATENT DOCUMENTS

| | | | |
|---|---|---|---|
| CN | 208186005 U | 12/2018 | |
| WO | 2018009697 A1 | 1/2018 | |

OTHER PUBLICATIONS

Office Action for Canadian Application No. 3,121,812 dated Jun. 8, 2023, 3 pages.

(Continued)

*Primary Examiner* — Daniel D Chang
(74) *Attorney, Agent, or Firm* — Wood IP, LLC; Theodore A. Wood

(57) ABSTRACT

Provided is a controller and a luminaire having the controller. The controller is provided in the luminaire, and may include a switch assembly provided on a side where a light outlet of the luminaire is located and configured to receive a selecting signal that is input from the outside, and a control board connected with the switch assembly and configured to generate a corresponding control signal on the basis of the selecting signal, so as to control a plurality of light sources of the luminaire to form at least two types of Correlated Color Temperatures (CCT), brightness and/or colors respectively. By the disclosure, the problem that it is hard for a user to adjust the CCT, the brightness and/or the color of the luminaire in the prior art is solved, and operating convenience of the user is improved.

19 Claims, 10 Drawing Sheets

(51) Int. Cl.

| | |
|---|---|
| ***F21V 3/00*** | (2015.01) |
| ***F21V 23/00*** | (2015.01) |
| ***H05B 45/10*** | (2020.01) |
| ***H05B 45/20*** | (2020.01) |
| *F21Y 113/13* | (2016.01) |

(52) U.S. Cl.
CPC ............. *H05B 45/10* (2020.01); *H05B 45/20* (2020.01); *F21Y 2113/13* (2016.08)

(56) References Cited

U.S. PATENT DOCUMENTS

| | | | | |
|---|---|---|---|---|
| 9,820,350 | B2 | 11/2017 | Pyshos et al. | |
| 9,892,693 | B1 | 2/2018 | Kumar et al. | |
| 2016/0363297 | A1* | 12/2016 | Boulanger | F21V 21/04 |
| 2018/0012710 | A1* | 1/2018 | Lark, Jr. | H02G 3/14 |
| 2018/0206305 | A1* | 7/2018 | Van Winkle | F21S 8/026 |
| 2019/0027099 | A1* | 1/2019 | Kumar | F21S 8/04 |
| 2019/0318697 | A1 | 10/2019 | Kumar et al. | |

OTHER PUBLICATIONS

Office Action for Canadian Application No. 3,121,812 dated Feb. 7, 2024, 4 pages.

* cited by examiner

CONTROLLER AND LUMINAIRE HAVING CONTROLLER

CROSS-REFERENCE TO RELATED APPLICATIONS

This application is a continuation of U.S. patent application Ser. No. 17/365,470, filed Jul. 1, 2021, which claims the benefit of Chinese Patent Application Serial Number 202021252600.4, filed Jul. 1, 2020, both of which are incorporated herein by reference.

FIELD OF TECHNOLOGY

The disclosure relates to the field of illuminating systems, and in particular to a controller and a luminaire having the controller.

BACKGROUND

In a traditional design of a luminaire, a control switch is usually provided on the back of a Recess Can (RS). When a user digs an aperture on a ceiling to mount the luminaire into the aperture in a recessed manner, the switch is unavailable for the user. In this way, the user may not change a Correlated Color Temperature (CCT), a color and brightness of the luminaire when the luminaire is mounted.

In another existing design of adjusting the CCT of the luminaire having a can, the can is mounted under the ceiling, however the luminaire needs to be separated from the can when adjusting the CCT, the brightness or the color, and the CCT, the brightness or the color may be adjusted through a toggle switch on a back of the luminaire. It is very inconvenient for the user.

SUMMARY

The disclosure provides a controller and a luminaire having the controller.

According to an aspect of embodiments of the disclosure, a controller is provided. The controller is provided in a luminaire and includes: a switch assembly configured on a side where a light outlet of the luminaire is located and configured to receive a selecting signal that is input from the outside, and a control board electrically coupled to the switch assembly and configured to generate a corresponding control signal on the basis of the selecting signal, so as to control a plurality of light sources of the luminaire to form at least two types of Correlated Color Temperatures (CCT), brightness and/or colors respectively.

In an example embodiment, the control board controls the light sources of the luminaire to form more than three types of CCTs, brightness and/or color, respectively.

In an example embodiment, the switch assembly may include a CCT selecting switch, a brightness selecting switch and/or a color selecting switch.

In an example embodiment, one of the CCT selecting switch, the brightness selecting switch and the color selecting switch is a toggle switch, a button switch or a touch switch.

In an example embodiment, at least two scales are provided beside the toggle switch, and each of the scales corresponds to different CCTs, brightness, or colors.

In an example embodiment, the touch switch may include at least two sub-switches, and each of the sub-switches corresponds to the different CCTs, brightness or colors.

According to an aspect of embodiments of the disclosure, a luminaire is provided. The luminaire includes: a body, a plurality of light sources provided in a cavity which is formed by the body and configured to emit lights toward a light outlet of the body, and the abovementioned controller.

In an example embodiment, the control board is located in the body.

In an example embodiment, a switch assembly is provided on a light outlet surface of the body.

In an example embodiment, the luminaire may further include a diffuser. The diffuser covers the light outlet of the body, wherein the switch assembly is provided on the diffuser.

In an example embodiment, the diffuser and a holder may be further included. The diffuser covers the light outlet of the body, the holder is provided around the diffuser, and the switch assembly is provided on the holder.

In an example embodiment, a trim may be further included, and the trim covers a front end of the holder.

In an example embodiment, a driver board may be further included. The driver board is located in a driving box, and the driving box is separately or integrally connected with the body.

In an example embodiment, at least two power lines are provided between the driver board and the controller. A first power line among the two power lines is configured to connect a positive voltage output of the driver board with the light sources, and a second power line is configured to connect a negative voltage output of the driver board with the control board. The light sources are serially connected with the control board, and an output of the control board is connected to the ground.

In an example embodiment, the light sources may include at least two light-emitting diodes, and the at least two light-emitting diodes are backlit or edgelit.

In an example embodiment, when the at least two light-emitting diodes are edgelit, the body may further include the holder, a glare free, a light guide, a reflector, an Ethylene-Vinyl Acetate (EVA) foaming element, a Printed Circuit Board (PCB) and a heatsink.

In an example embodiment, when the at least two light-emitting diodes are backlit, and the body may further include the holder, the reflector, the PCB and the heatsink.

In an example embodiment, the luminaire is a recessed light, and a mounting component of the body is configured to mount the luminaire in a recessed manner.

In an example embodiment, the luminaire is a disk light, and the mounting component of the body is configured to mount the disk-shaped luminaire in the recessed manner or mount the disk light on a surface.

The luminaire with the abovementioned structure provided by the disclosure solves the problem that it is hard for a user to adjust the CCT, the brightness and/or the color of the luminaire in the related art, and has beneficial effect of improving operating convenience of the user.

BRIEF DESCRIPTION OF THE DRAWINGS

The accompanying drawings described herein are used to provide a further understanding of the disclosure, and constitute a part of the application, and the example embodiments of the disclosure and the description thereof are used to explain the disclosure, but do not constitute improper limitations to the disclosure. In the drawings.

Figure 1:
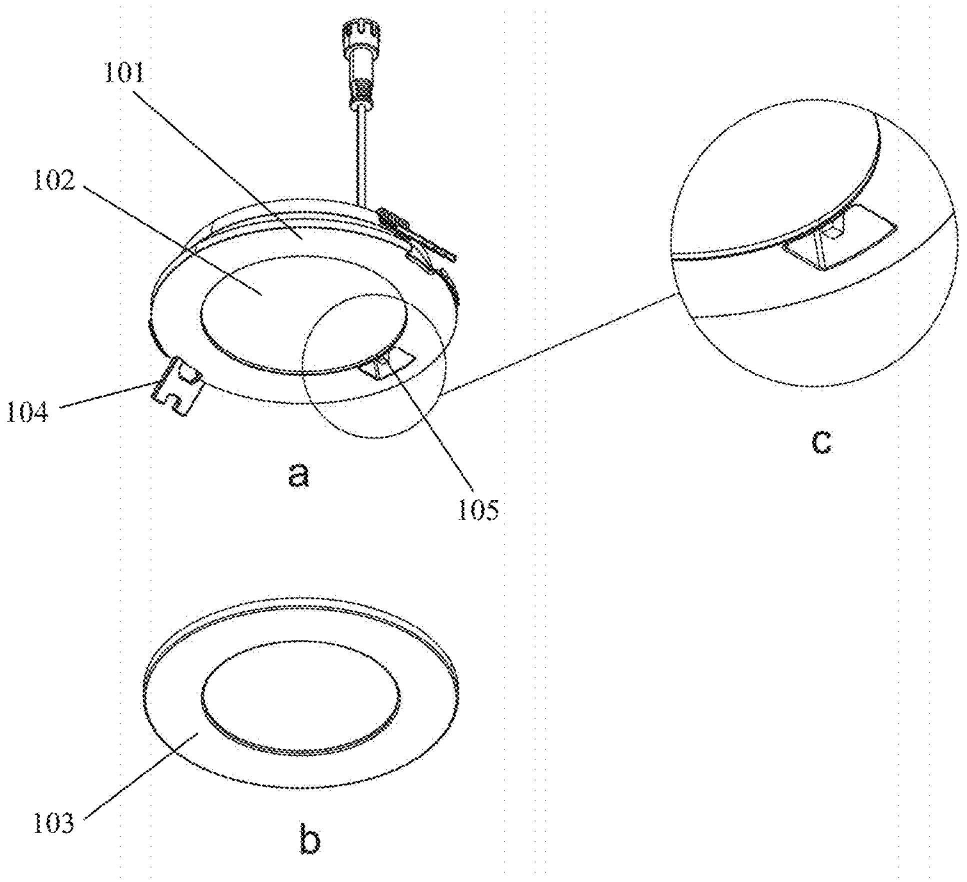
FIG. 1 is a stereo structure diagram of a luminaire having a toggle switch according to an example embodiment of the disclosure.

Herein, the abovementioned drawings may include the following reference numbers:

100 Luminaire
101 Holder
102 Diffuser
103 Trim
104 Mounting component
105 Switch assembly
202 Cable
203 Heatsink
204 Reflector
205 Control board
206 PCB
207 EVA foaming element
208 Light guide
209 Glare free element
210 Driving box
211 Driver board
212, 212-1, 212-2 Light-emitting diode
213 Driving control board

DETAILED DESCRIPTION

It is to be noted that embodiments in the application and features in the example embodiments may be combined with each other without conflict. The disclosure will be described below in detail with reference to drawings and in combination with the embodiments.

It should be pointed out that, unless otherwise indicated, all technical and scientific terms used in the application have meanings identical with those generally understood by those of ordinary skill in the art of the application.

In the disclosure, when there is no contrary description available, terms used herein, such as “upper”, “lower”, “top” and “bottom” are for directions shown in the drawings, or for the parts in vertical, perpendicular or gravitational directions. Likewise, in order to facilitate understanding and description, terms “inner” and “outer” are the inside and the outside relative to an outline of each part, but the abovementioned terms are not intended to limit the disclosure.

Figure 11:
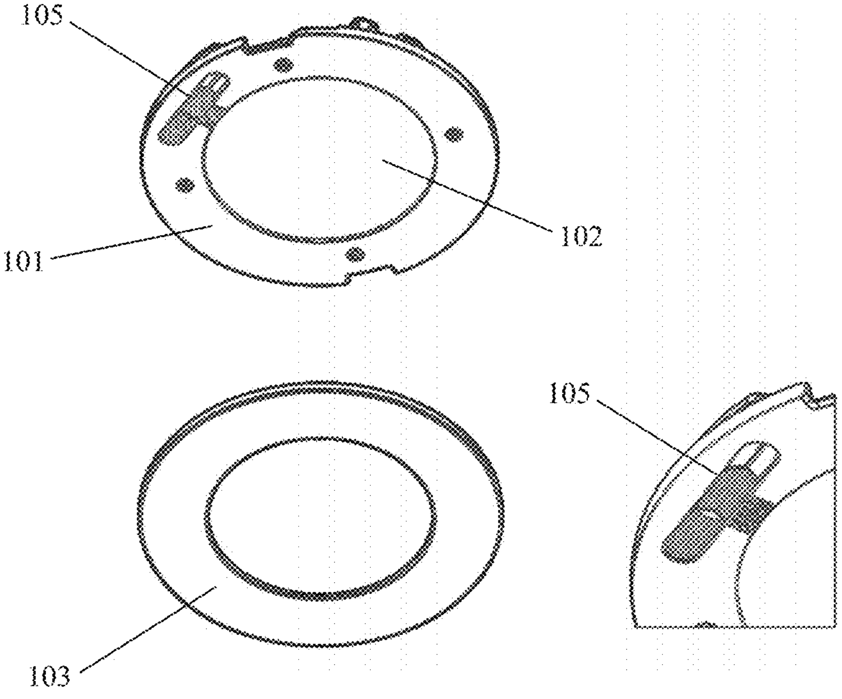
FIG. 11 is a stereo structure diagram of another luminaire according to an example embodiment of the disclosure.

FIG. 1 is a stereo structure diagram of a luminaire having a toggle switch according to an example embodiment of the disclosure. Herein, a in FIG. 1 is a structure diagram of the luminaire after removal of a trim 103, b in FIG. 1 is a structure diagram of the trim 103 of the luminaire, and c in FIG. 1 is a structure diagram of the toggle switch after amplification. Referring to FIG. 1 and FIG. 11 (FIG. 11 is a stereo structure diagram of another luminaire having a toggle switch according to an example embodiment of the disclosure), the shown luminaire 100 may be inserted in an aperture in a ceiling to provide overhead lighting. The luminaire 100 may include a body and a mounting component 104. The body may include a holder 101, a diffuser 102, the trim 103 and a switch assembly 105. Herein, the switch assembly 105 may include a CCT selecting switch, a brightness selecting switch and/or a color selecting switch. The toggle switch, a button switch or a touch switch may be taken as the CCT selecting switch, the brightness selecting switch and the color selecting switch. In this example embodiment, the switch assembly 105 is the toggle switch.

The body is presented as a can and has a cavity therein. A front end of the body is provided with the holder 101 for fixing the diffuser 102. The holder 101 has a light outlet surface and a side surface, the light outlet surface providing with a round opening as a light outlet. The diffuser 102 covers the light outlet. The holder 101 may be made from multiple thermally conductive materials, such as stainless steel, aluminum and iron. In this case, the holder 101, which is as a radiator, may absorb heat generated by one or a plurality of assemblies (such as a circuit board where a light-emitting diode is located) thermally connected with the holder 101, and dissipate the heat subsequently.

The trim 103 is an ornament which circumferentially extends around the light outlet surface of the body (such as the light outlet surface of the holder 101). When the luminaire 100 is mounted in the aperture of the ceiling, the trim 103 circumscribes and covers the edge of the ceiling aperture for aesthetics. The trim 103 may be mounted on the light outlet surface of the holder 101 through fastening or spinning. In an example embodiment, the trim 103 is configured to cover the switch assembly 105. When a user adjusts the CCT, the brightness and/or the color, the trim 103 needs to be removed. In an example embodiment, the trim 103 may be provided with an opening (not shown) thereon, such that the user may control the switch assembly 105 through the opening without removing the trim 103. In an example embodiment, the switch assembly 105 may also be mounted on the trim directly. Optionally, the luminaire 100 may also not have the trim 103.

The mounting component 104 is provided on a side surface of the luminaire and configured to be able to fix the luminaire 100 at a predetermined position.

The switch assembly 105 is configured on the light outlet surface of the body. Optionally, the switch assembly 105 may include one toggle switch which may be used for selecting different CCTs, brightness or colors, in this way the user is facilitated to adjust the CCT, the brightness or the color conveniently and effectively. In the example embodiment, different control signals are sent to a control board of the luminaire by toggling a sliding block of the toggle switch to different positions, in this way the CCT, the brightness or the color is switched. A single-pole on-off toggle switch, a single-pole three-position toggle switch, a double-pole double-position toggle switch and a double-pole three-position toggle switch may be usually taken as the toggle switch, and the sliding blocks thereof have flexible movement and stable functions.

Selection for the CCT, the brightness or the color may be displayed nearby the switch assembly 105. In the example embodiment, at least two scales are configured beside the toggle switch, and each of the scales corresponds to different CCTs, brightness or colors. In the example embodiment, five scales which respectively correspond to the CCT 2700K/3000K/3500K/4000K/5000K are provided beside the toggle switch.

In an example embodiment, the switch assembly 105 may include a main body and multiple pins configured on a bottom of the main body, the pins being allowed to be electrically coupled to the control board of the luminaire. A toggler is provided on a top of the main body, and the user may operate the toggler to input a selecting signal. The main body of the switch assembly 105 is provided with a slot, and the toggler extends through the slot. The switch assembly 105 may include multiple detents to limit stopping locations for the toggler along the length of the slot. Each of these detents may be associated with a certain value which affects the CCT, the brightness or the color. For example, if the switch assembly 105 is used to select 1000K CCT, an intermediate position of the slot may be configured to be associated with the 1000K CCT, and the selecting signal indicating the 1000K CCT is selected may be generated when the toggler is toggled to a position of an intermediate detent of the slot.

In the example embodiment, the luminaire is a recessed light, and only the trim and the diffuser may be seen when the luminaire is mounted. When there is no trim available, only the holder and the diffuser may be seen. In other embodiments, the luminaire is a disk light, and the mounting component of the disk light is configured to mount the disk light in a recessed manner or mount the disk light on a surface.

Figure 2:
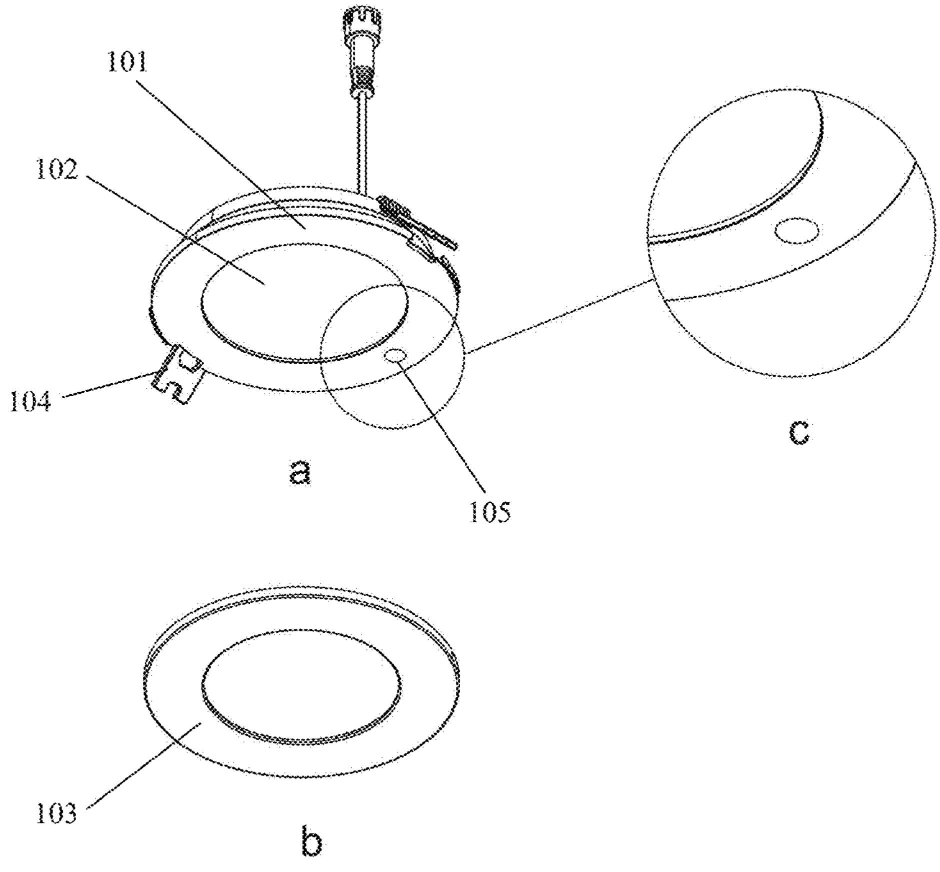
FIG. 2 is a stereo structure diagram of a luminaire having a button switch according to an example embodiment of the disclosure.

FIG. 2 is a stereo structure diagram of a luminaire having a button switch according to an example embodiment of the disclosure. Herein, a in FIG. 2 is a structure diagram of the luminaire after removal of a trim 103, b in FIG. 2 is a structure diagram of the trim 103 of the luminaire, and c in FIG. 2 is a structure diagram of the button switch after amplification.

Figure 9:
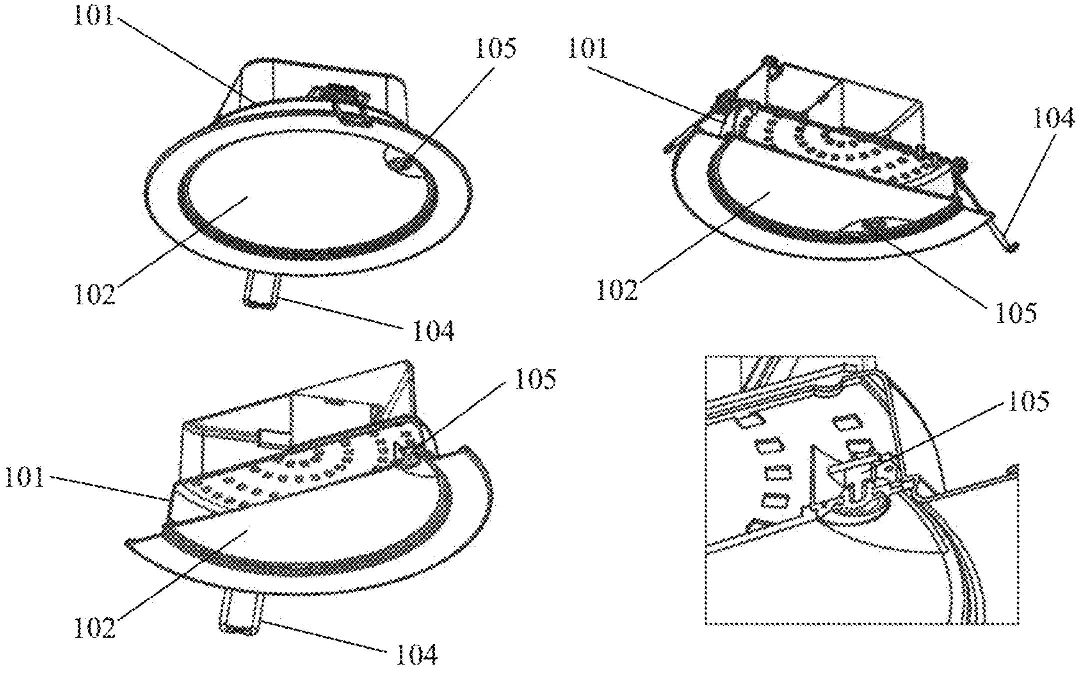
FIG. 9 and FIG. 10 are section views of a luminaire according to an example embodiment of the disclosure.

A difference between the luminaire in FIG. 2 and the luminaire in FIG. 1 is that a switch assembly 105 may include the button switch provided on a light outlet surface of a holder 101. The button switch pushes a transmission mechanism with a button, in this way a movable contact is connected or disconnected with a static contact, and different selecting signals are sent to a control board according to connection or disconnection times, so as to control the CCT, brightness and/or a color of the luminaire through the control board. In the example embodiment, the switch assembly 105 may also be mounted on a diffuser 102. FIG. 9 is a section view of a luminaire according to an example embodiment of the disclosure, and shows that the button switch is provided on the diffuser 102.

Figure 3:
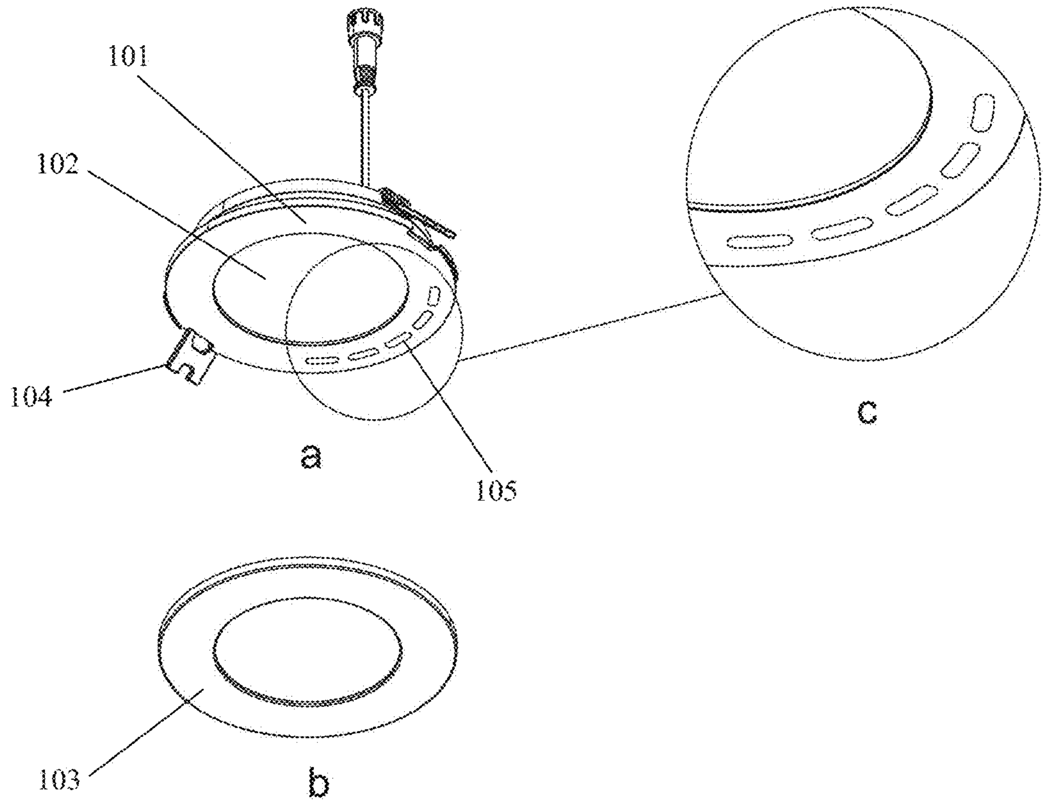
FIG. 3 is a stereo structure diagram of a luminaire having a touch switch according to an example embodiment of the disclosure.
Figure 10:
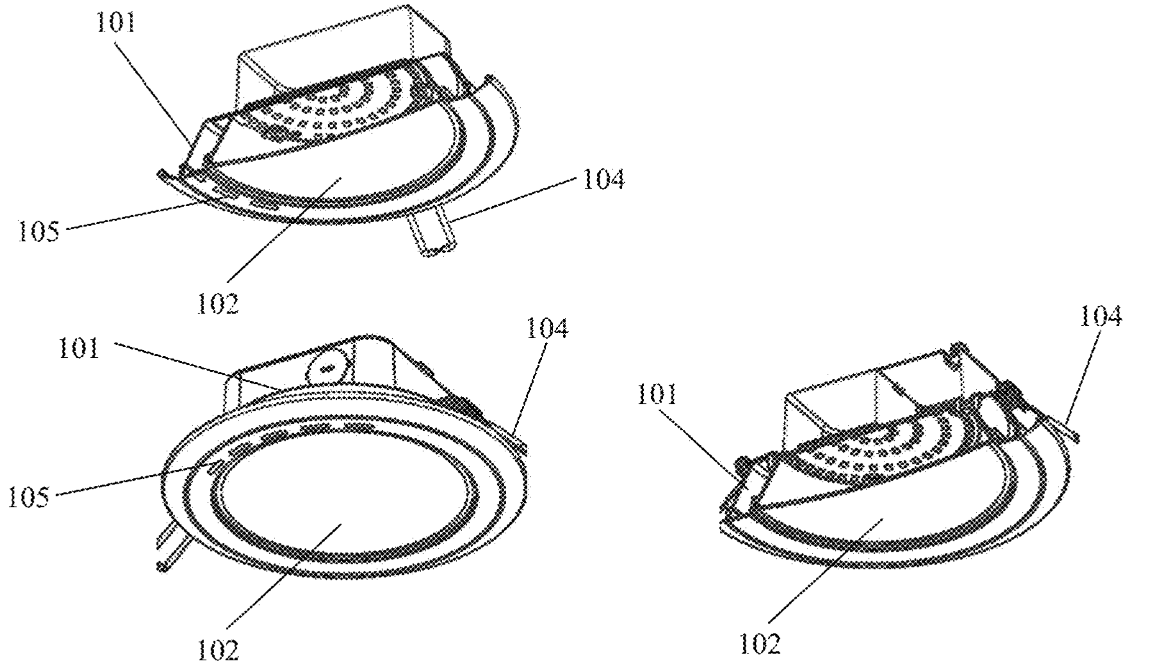

FIG. 3 is a stereo structure diagram of a luminaire having a touch switch according to an example embodiment of the disclosure. Herein, a in FIG. 3 is a structure diagram of the luminaire after removal of a trim 103, b in FIG. 3 is a structure diagram of the trim 103 of the luminaire, and c in FIG. 3 is a structure diagram of the touch switch after amplification. FIG. 10 is a section view of a luminaire according to an example embodiment of the disclosure.

A difference between the luminaire in FIG. 3 and the luminaire in FIG. 1 is that a switch assembly 105 may include the touch switch which is provided on a light outlet surface of a holder 101 and includes at least two sub-switches, each of the sub-switches corresponding to different CCT, brightness or colors. In the example embodiment, the touch switch may include five sub-switches which correspond to the 2700K/3000K/3500K/4000K/5000K CCT, respectively. In the example embodiment, a corresponding CCT value is marked nearby each sub-switch. In an example embodiment, the touch switch may be a capacitive touch switch which is implemented through a capacitive sensing technology. When a finger touches a sensing area, a change of a capacitance may be caused, in this way different selecting signals may be sent to a control board, so as to control the CCT, the brightness or the color of the luminaire through the control board.

In an example embodiment, the switch assembly 105 may include two or more than two sub-switches as well. For example, one sub-switch is used for selecting the CCT, another sub-switch is used for selecting the brightness or the color. Or, one sub-switch is used for selecting the CCT, and another two sub-switches are used for respectively selecting the brightness and the color. But the switch assembly 105 is not limited to the abovementioned combinations.

In the abovementioned embodiment, a toggle switch and a touch switch, relative to the button switch, have the following advantages: it is visual to select positions of the toggle switch and the touch switch, namely, a user may easily know the current CCT, the current brightness or the current color of the luminaire through a position where the toggle switch is located or a touch sub-switch which is turned on. While the toggle switch, compared with the touch switch, is cheaper and may be implemented more easily.

Besides the toggle switch, the button switch and the touch switch shown in the abovementioned FIG. 1, FIG. 2 and FIG. 3, the switch assembly 105 may further be any of several types of switches in other embodiments, for example, a Dual In-line Package (DIP) switch, a Single In-line Pin Package (SIPP) switch, a rocker switch, a reed switch, a magnetic switch, a rotary switch, a rotary dials, a selector or a selector switch, a slide switch, a snap switch, a thumbwheel, and keys or a small keypad.

Figure 4:
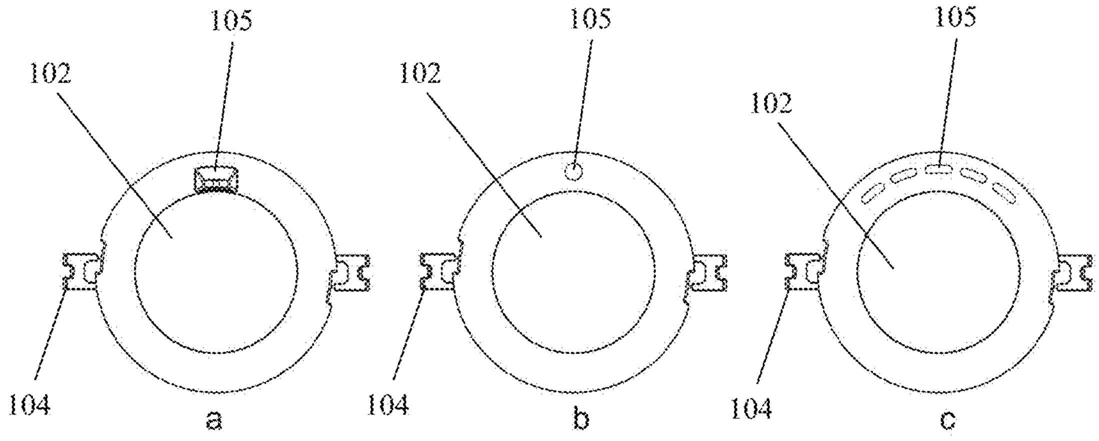
FIG. 4 is a bottom view of a luminaire according to an example embodiment of the disclosure.

In order to facilitate the user to conveniently touch the switch assembly 105, as mentioned above, at least one part of the switch assembly 105 may be provided on a light outlet surface of the body (such as the light outlet surface of the holder 101), as shown in FIG. 4. The user may conveniently operate the switch assembly 105 after removing the trim. In FIG. 4, the switch shown by a is the toggle switch, the switch shown by b is the button switch, and the switch shown by c is the touch switch. As an alternative, one part of the switch assembly 105 may protrude through an aperture provided on the diffuser 102, namely, the switch assembly 105 is provided on the diffuser, so as to allow the user to directly operate the switch assembly 105 which protrudes from the aperture in the diffuser, as shown in FIG. 9. In other embodiments, the switch assembly 105 may further be provided on or behind the trim.

In an example embodiment, a plurality of light sources may include at least two groups of light-emitting diodes and each group of the light-emitting diodes may include at least one light-emitting diode. The at least two groups of light-emitting diodes are backlit or edgelit.

Figure 5:
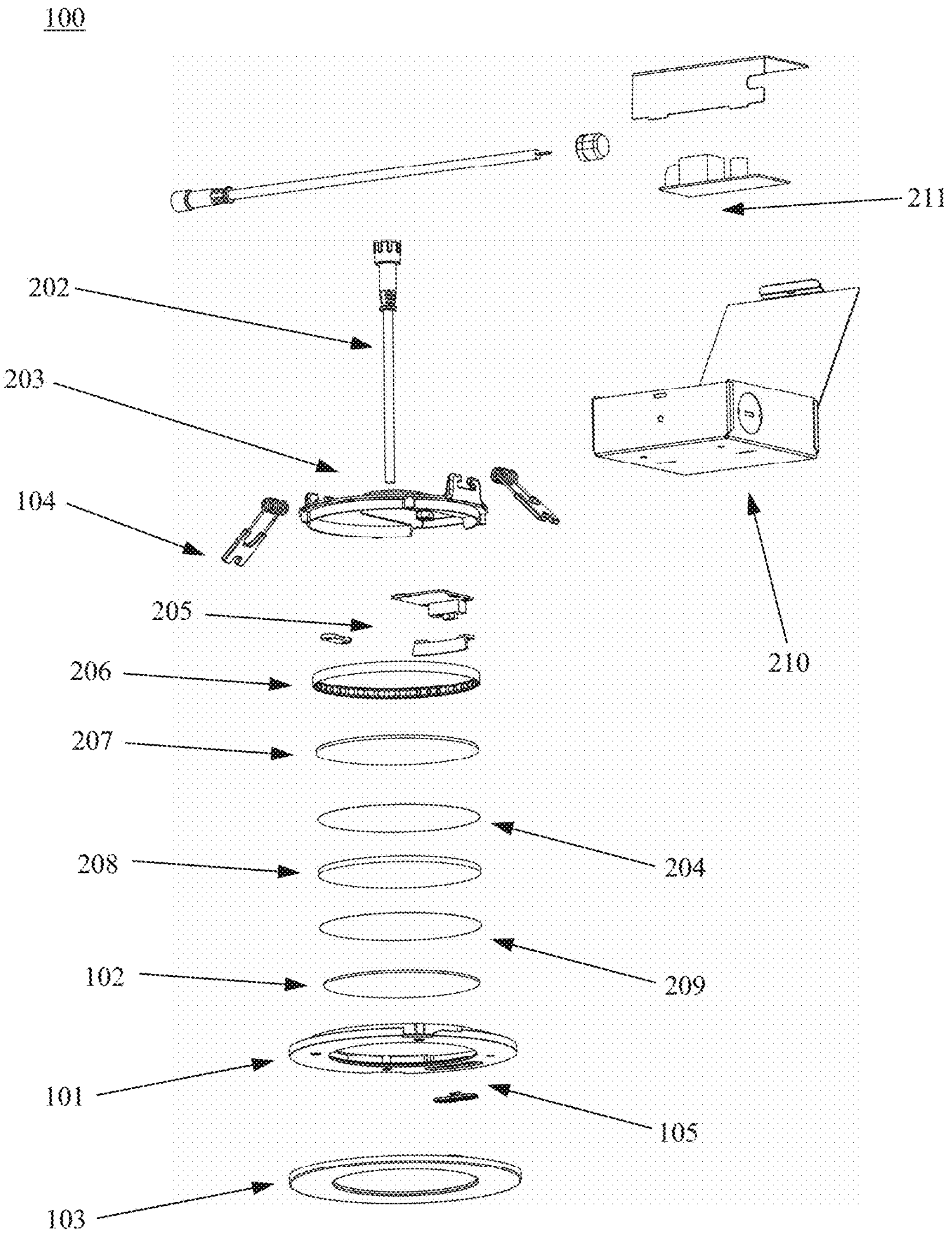
FIG. 5 is a schematic diagram of all separate parts of an edgelit LED luminaire having a toggle switch according to an example embodiment of the disclosure.

FIG. 5 is a schematic diagram of all separate parts of an edgelit LED luminaire having a toggle switch according to an example embodiment of the disclosure. Referring to FIG. 5 and FIG. 11, a luminaire 100 may include a cable 202, a driving box 210, a mounting component 104 and a body. The body may include a heatsink 203, a control board 205, a Printed Circuit Board (PCB) 206, an Ethylene Vinyl Acetate (EVA) foaming element 207, a reflector 204, a light guide 208, a glare free 209, a diffuser 102, a holder 101, a switch assembly 105 and a trim 103. The driving box 210 is provided with a driver board 211 therein. In an example embodiment, the mounting component 104 is located on a side surface of the heatsink 203.

In the example embodiment, the body is presented as a can and has a cavity in the middle. The cavity is formed by the holder 101 and the heatsink 203. A round opening is formed on a front end of the body, as a light outlet. The cavity of the body is used for accommodating the diffuser 102, the glare free 209, the light guide 208, the reflector 204, the EVA foaming element 207, the PCB 206 and the control board 205 sequentially. The trim 103 is provided on the front end of the body (for example, a front end of the holder 101), and the mounting component 104 is configured on a side surface of the body.

In the example embodiment, the cable 202 is configured to connect the driver board 211 with the control board 205 and the PCB 206 of the luminaire. Three power lines, which extend through a wiring aperture in the heatsink 203 and connect to the control board 205 and the PCB 206, are provided in the cable 202. The heatsink 203 is provided on the PCB 206 for heat dissipation. The mounting component 104 is provided on the side surface of the body and may be a sgraobet or an elastic clamp spring for fixing and supporting the luminaire.

In the example embodiment, the PCB 206 may be a Metal Core PCB (MCPCB) on which a plurality of light sources are welded. The light sources may include multiple groups of light-emitting diodes, and each group of the light-emitting diodes has different Correlated Color Temperatures (CCT), brightness and/or colors. In some embodiments, the each group of the light-emitting diodes may have identical CCT, brightness and/or color, and the each group of the light-emitting diodes may be controlled to form different CCTs, brightness and/or colors by controlling a current passing the each group of the light-emitting diodes.

In the example embodiment, the light-emitting diodes are distributed and welded on the PCB 206. In other embodiments, the light-emitting diodes may be separated from each other or spatially separated according to the CCT, the brightness and/or the color or other appropriate parameters. The cable 202 provides power to the light-emitting diode, as to controls the CCT, the brightness and/or the color of the light-emitting diode on the basis of control of the switch assembly 105.

In the example embodiment, the control board 205 is connected to the PCB 206 and operates the light-emitting diode on the PCB 206 according to a state of the switch assembly 105. In some example embodiments, the control board 205 may include logic implemented in digital circuitry, for example, discrete digital components or integrated circuitry. The control board 205 and the PCB 206 may be integrated on a circuit board and, as an alternative, constructed as the different circuit boards. In some example embodiments, the control board 205 utilizes microprocessor-implemented logic with instructions stored in firmware or other static or non-transient memories to control the CCT, the brightness and/or the color. In some example embodiments, the control board 205 controls the current passing the light-emitting diode to control the CCT, the brightness and/or the color of the light-emitting diode.

In the example embodiment, the switch assembly 105 is the toggle switch. The switch assembly 105 may be provided on a light outlet surface of the body, namely, located on the holder 101.

In the example embodiment, the EVA foaming element 207 for sealing is frothing foam and provided on a circumferential edge between the PCB 206 and the reflector 204.

The reflector 204 and the light guide 208 guide the light emitted by the light-emitting diode toward a direction where the diffuser 102 is located (namely, a side where a light outlet is located). The glare free 209 for preventing glare is provided between the light guide 208 and the diffuser 102.

In the example embodiment, the trim 103 has an inner diameter surrounded by a clamping part. When being mounted, the trim 103 will be tightly clamped after the clamping part falls into a recess on a front end of the holder 101. In other embodiments, the trim 103 may be mounted onto the front end of the holder 101 through other mounting modes, for example, spinning and adjunction, thereby playing a role of decoration.

In the example embodiment, peripheral electrical elements, for example, the driving box 210 and the driver board 211, are needed when mounting the luminaire. The driving box 210 is configured to connect an external power line pipe with the driver board 211. In this way, lines in the power line pipe are connected in the driving box 210, and meanwhile the driving box 210 may protect and connect the lines. A top of the driving box 210 is provided with a pressing fastener which fixes the power line, and a ground wire is fixed on the top of the driving box through the pressing fastener. The driver board 211 is located in the driving box, and the driving box is separately or integrally connected with the body.

Figure 6:
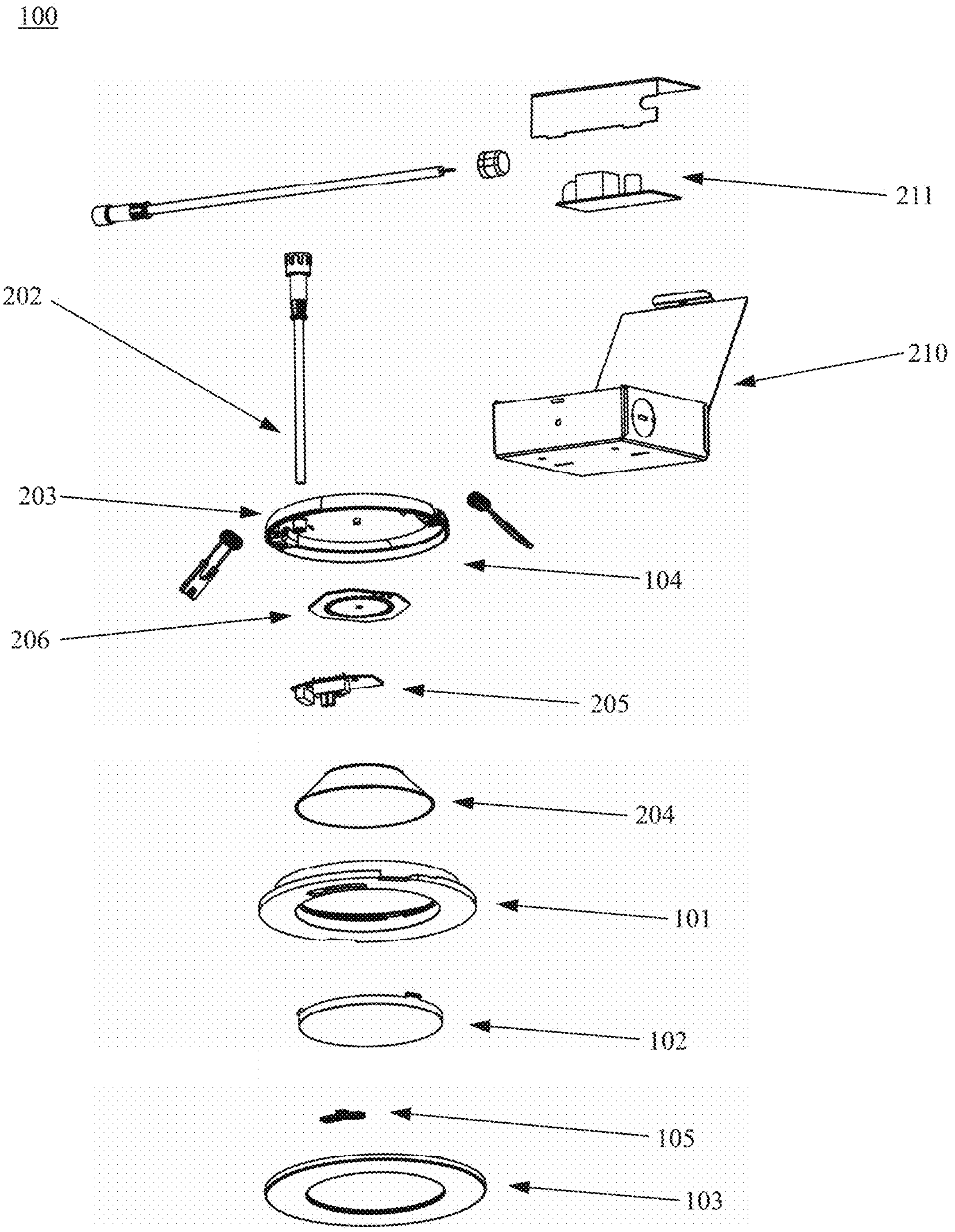
FIG. 6 is a schematic diagram of all separate parts of a backlit LED luminaire having a toggle switch according to an example embodiment of the disclosure.

FIG. 6 is a schematic diagram of all separate parts of a backlit LED luminaire having a toggle switch according to an example embodiment of the disclosure. As shown in FIG. 6, the luminaire 100 may include a cable 202, a body, a mounting component 104 and a driving box 210. The body may include a heatsink 203, a Printed Circuit Board (PCB) 206, a control board 205, a reflector 204, a diffuser 102, a holder 101, a switch assembly 105, and a trim 103. The driving box 210 is provided with a driver board 211 therein. In an example embodiment, the mounting component 104 is located on a side surface of the heatsink 203.

Structures and functions of all parts included in the luminaire 100 shown in FIG. 6 are the same as those in FIG. 5, and differences between the two are described only here. In the example embodiment, the body of the luminaire 100 is presented as a can and has a cavity therein. The cavity is formed by the holder 101 and the heatsink 203. A round opening is formed in a light outlet surface of the body, as a light outlet. The cavity of the body accommodates the diffuser 102, the reflector 204, the control board 205 and the PCB 206 sequentially. The control board 205 is provided under the PCB 206. The diffuser 102 is connected with the light outlet surface of the body through the holder 101 in a clamping manner, so as to cover the opening formed by the light outlet surface of the body.

The luminaire 100 is not limited to the structures shown in FIG. 5 and FIG. 6. In other embodiments, the luminaire 100 may include but not limited to one or more of the following components, a lens, a reflector, a control board, a driver, a sensor and multiple LEDs. One or more of these components may be provided in the cavity formed by one or more surfaces (for example, the light outlet surface and a side surface) of the body of the luminaire.

Figure 7:
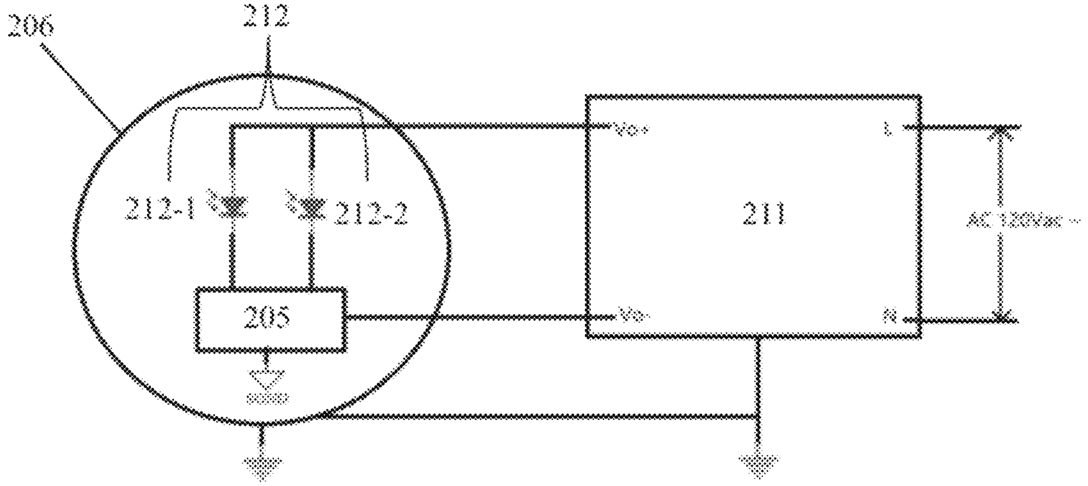
FIG. 7 is a diagram of a control circuit of a luminaire according to an example embodiment of the disclosure.

FIG. 7 is a diagram of a control circuit of a luminaire according to an example embodiment of the disclosure. As shown in FIG. 7, the control circuit may include a driver board 211, a control board 205 and light-emitting diodes 212, herein, two groups of light-emitting diodes 212-1 and 212-2 are connected in parallel, and the parallel light-emitting diodes 212 are connected with the control board 205 serially. Each group of the light-emitting diodes may include at least one light-emitting diode. A positive voltage output of the driver board 211 is connected to an anode of the light-emitting diode 212 through a first power line, a negative voltage output of the driver board 211 is connected to the control board 205 through a second power line, and another output of the control board 205 is connected to the ground. Another output of the driver board 211 is connected to a PCB 206 for fixing the light-emitting diodes 212 through a third power line, and is connected to the ground. In addition, the PCB 206 is connected to the ground as well.

The control board 205 generates a control signal according to a selecting signal of a switch assembly 105, so as to control a Correlated Color Temperature, brightness and/or a color of the light-emitting diode 212. For example, suppose the light-emitting diode 212-1 generates lights with the 1000K CCT and the light-emitting diode 212-2 generates lights with the 2000K CCT. When the switch assembly 105 sends a selecting signal for enabling the light-emitting diode 212-1, the control board 205 makes the light-emitting diode 212-2 disconnected and the light-emitting diode 212-1 connected, such that the CCT of the luminaire 100 is the CCT of the light-emitting diode 212-1, namely, 1000K. When the switch assembly 105 sends a selecting signal for enabling the light-emitting diode 212-2, the control board 205 makes the light-emitting diode 212-2 connected and the light-emitting diode 212-1 disconnected, such that the CCT of the luminaire 100 is the CCT of the light-emitting diode 212-2, namely, 2000K. When the switch assembly 105 sends a selecting signal for enabling the light-emitting diodes 212-1 and 212-2, the control board 205 makes the light-emitting diodes 212-2 and 212-1 connected, such that the CCT of the luminaire 100 is the CCTs of the light-emitting diodes 212-1 and 212-2, namely, 3000K.

In some other example embodiments, the control board 205 may adjust light output of the light-emitting diodes 212-1 and 212-2, so as to generate the different CCTs, the brightness and/or the colors. For example, the control board 205 may generate a control signal for adjusting currents which pass the light-emitting diodes 212-1 and 212-2 respectively on the basis of the selecting signal of the switch assembly 105, so as to adjust the CCT, the brightness and/or color of the light-emitting diodes 212-1 and 212-2.

Figure 8:
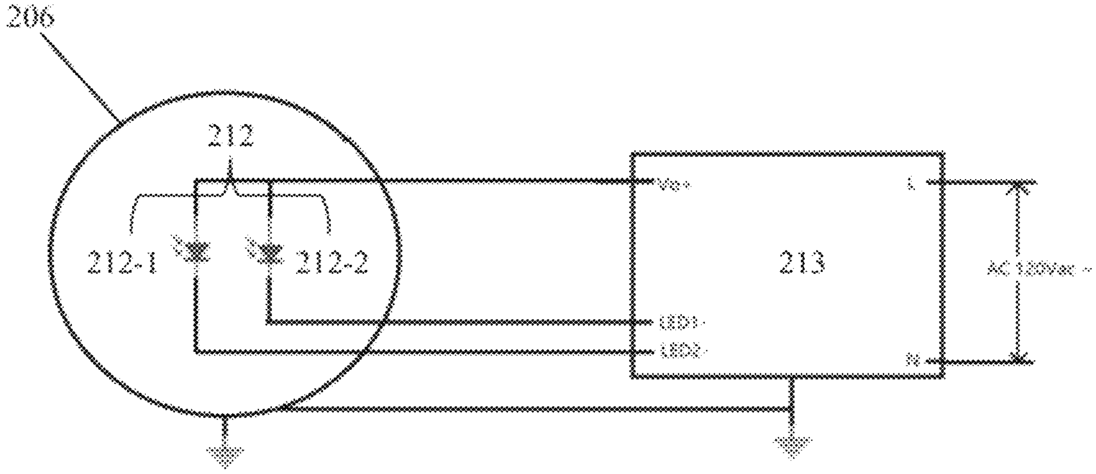
FIG. 8 PRIOR ART
FIG. 8 is a diagram of a control circuit of a luminaire according to the prior art.

FIG. 8 is a diagram of a control circuit of a luminaire according to the prior art. Compared with the control circuit of the disclosure shown in FIG. 7, a control board and a driver board of the control circuit in FIG. 8 are integrated on one circuit board, namely, a driving control board 213. Moreover, the circuit board is provided in a driving box of the luminaire, namely, not provided in a body of the luminaire. While a control board 205 provided by the present example embodiment is provided in the body of the luminaire and connected with a PCB 206 which fixes light-emitting diodes.

According to FIG. 8, the luminaire needs to be dismounted from a ceiling if a user intends to change a CCT, brightness and/or a color of the luminaire when the luminaire is mounted, and adjustment needs to be implemented on a back of the body of the luminaire or on the driving box integrally or remotely connected with the back of the luminaire. It is very inconvenient. In the luminaire provided by the embodiment of the disclosure, a toggle switch or a touch switch or a button switch is provided on a side of a light outlet, and each of operations from these switches corresponds to one selecting signal, so as to control at least two groups of light-emitting diodes through the circuit. In this way, even though the luminaire has been mounted, the user may conveniently change the CCT, the brightness and/or the color on a light outlet surface of the luminaire (a side close to the user) without needing a remote control solution or a wall switch solution.

Figure 12:
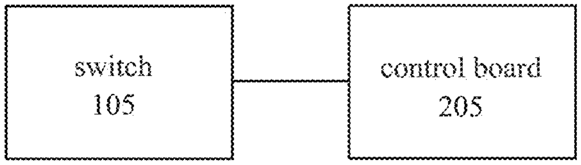
FIG. 12 is a structure diagram of a controller according to an example embodiment of the disclosure.

FIG. 12 is a structure diagram of a controller according to an example embodiment of the disclosure. As shown in FIG. 12, the controller may include a switch assembly 105 and a control board 205. The switch assembly 105 is provided on a side where a light outlet of a luminaire is located and configured to receive a selecting signal that is input from the outside. The control board 205 is connected with the switch assembly 105, and configured to generate a corresponding control signal on the basis of the selecting signal, so as to control a plurality of light sources of the luminaire to form at least two types of CCTs, brightness and/or colors, respectively.

In the example embodiment of the disclosure, the control board 205 controls the light sources of the luminaire to form more than three types of CCTs, brightness and/or colors, respectively. The switch assembly 105 may include a CCT selecting switch, a brightness selecting switch and/or a color selecting switch. A toggle switch, a button switch or a touch switch may be taken as the CCT selecting switch, the brightness selecting switch and the color selecting switch. At least two scales are provided beside the toggle switch, and each of the scales corresponds to different CCTs, brightness or colors. The touch switch may include at least two sub-switches, and each of the sub-switches corresponds to different CCTs, brightness or colors.

It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be noted that terms used herein are merely intended to describe specific embodiments rather than limit example embodiments according to the application. Unless otherwise pointed out explicitly, a singular form used herein is also intended to include a plural form. In addition, it should also be understood that the term "include" and/or "comprise" used in the description indicates that there are features, steps, operations, devices, assemblies and/or combinations thereof.

It is to be noted that terms "first", "second" and the like in the description, claims and the abovementioned drawings of the application are used for distinguishing similar objects rather than describing a specific sequence or a precedence order. It should be understood that the data used in such a way may be exchanged where appropriate, in order that the embodiments of the application described here may be implemented in a sequence other than sequences graphically shown or described here.

The above are only preferred embodiments of the disclosure and are not intended to limit the disclosure. Those skilled in the art may make various modifications and variations. Any modifications, equivalent replacements, improvements and the like made within the spirit and principle of the disclosure shall fall within the scope of protection of the disclosure.

What we claim is:

1. A luminaire comprising:

a body having a back side and a light outlet side that comprises a light outlet of the body;

a plurality of light sources provided in a cavity which is formed by the body and configured to emit lights toward the light outlet of the body;

a driver board; and a controller comprising a switch assembly and a control board, wherein the control board is configured to serially connect between the plurality of light sources and the driver board, wherein at least two power lines are provided between the driver board and the controller; a first power line among the at least two power lines is configured to connect a positive voltage output of the driver board with the plurality of light sources being connected to the first power line, a second power line among the at least two power lines is configured to connect a negative voltage output of the driver board with the control board, and an output of the control board is configured to connect to the ground.

2. The luminaire of claim 1, wherein the driver board comprises a positive voltage output and a negative voltage output and the control board is connected between the light sources and the negative voltage output of the driver board.

3. The luminaire of claim 1, wherein the control board is located in the body.

4. The luminaire of claim 1, wherein the light outlet of the body comprises a light outlet surface of the body and the switch assembly is provided on the light outlet surface of the body.

5. The luminaire of claim 1, further comprising a diffuser covering the light outlet of the body, wherein the switch assembly is provided on the diffuser.

6. The luminaire of claim 1, further comprising a diffuser and a holder, the diffuser covering the light outlet of the body, and the holder being provided around the diffuser, wherein the switch assembly is configured on the holder.

7. The luminaire of claim 6, further comprising a trim for ornament, wherein the trim is configured to cover a front end of the holder.

8. The luminaire of claim 7, wherein the driver board is provided in a driving box, wherein the driving box is separately or integrally connected with the body.

9. The luminaire of claim 1, wherein the plurality of light sources comprises at least two light-emitting diodes, and the at least two light-emitting diodes are backlit or edgelit.

10. The luminaire of claim 9, wherein the body further comprises a holder, a glare free element, a light guide, a reflector, an Ethylene-Vinyl Acetate (EVA) foaming element, a Printed Circuit Board (PCB) and a heatsink, when the at least two light-emitting diodes are edgelit.

11. The luminaire of claim 9, wherein the body further comprises a holder, a reflector, a PCB and a heatsink, when the at least two light-emitting diodes are backlit.

12. The luminaire of claim 1, wherein the luminaire is a recessed light, and a mounting component of the body is configured to mount the recessed light in a recessed manner.

13. The luminaire of claim 1, wherein the luminaire is a disk light, and the mounting component of the body is configured to mount the disk light in a recessed manner or mount the disk light on a surface.

14. The luminaire of claim 1, wherein the switch assembly is provided on the light outlet side of the luminaire and configured to receive an external selecting signal through a switch element of the switch assembly and the control board is electrically coupled to the switch assembly and configured to generate a corresponding control signal on the basis of the selecting signal to control a plurality of light sources of the luminaire to form, for each light source of the plurality of light sources, at least two or more types selected from Correlated Color Temperatures (CCT), brightness, and colors.

15. The luminaire of claim 14, wherein the control board is configured to control the plurality of light sources of the luminaire to form, for each light source, more than three types selected from CCTs, brightness, and colors.

16. The luminaire of claim 14, wherein the switch element of the switch assembly comprises a CCT selecting switch, a brightness selecting switch, and/or a color selecting switch.

17. The luminaire of claim 16, wherein one of the CCT selecting switch, the brightness selecting switch and the color selecting switch is a toggle switch, a button switch or a touch switch.

18. The luminaire of claim 17, wherein the touch switch comprises at least two sub-switches, and each of the sub-switches corresponds to different CCTs, brightness or colors.

19. The luminaire of claim 17, wherein the toggle switch comprises at least two scales, and each of the scales corresponds to different CCTs, brightness or colors.

* * * * *